United States Patent
Zhang et al.

(10) Patent No.: US 9,930,688 B2
(45) Date of Patent: Mar. 27, 2018

(54) METHOD AND DEVICE FOR ENABLING DOWNLINK COORDINATED MULTIPOINT COMMUNICATION

(71) Applicant: Telefonaktiebolaget L M Ericsson (publ), Stockholm (SE)

(72) Inventors: Zhan Zhang, Beijing (CN); Shaohua Li, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 14/786,360

(22) PCT Filed: Apr. 26, 2013

(86) PCT No.: PCT/CN2013/074769
§ 371 (c)(1),
(2) Date: Oct. 22, 2015

(87) PCT Pub. No.: WO2014/172889
PCT Pub. Date: Oct. 30, 2014

(65) Prior Publication Data
US 2016/0066340 A1    Mar. 3, 2016

(51) Int. Cl.
*H04W 72/12*      (2009.01)
*H04B 7/024*      (2017.01)
(Continued)

(52) U.S. Cl.
CPC ........ *H04W 72/1231* (2013.01); *H04B 7/024* (2013.01); *H04B 7/0486* (2013.01);
(Continued)

(58) Field of Classification Search
CPC .............. H04W 72/1231; H04W 24/08; H04L 25/0204; H04B 7/0486; H04B 7/024; H04B 7/0639; H04B 7/063
See application file for complete search history.

(56) References Cited

U.S. PATENT DOCUMENTS

2010/0322176 A1* 12/2010 Chen ...................... H04B 7/024
                                                        370/329
2012/0196607 A1*  8/2012 Samardzija .......... H04J 11/0053
                                                        455/450
(Continued)

FOREIGN PATENT DOCUMENTS

CN        102378275 A      3/2012

OTHER PUBLICATIONS

A Novel CQI Calculation Scheme in LTE/LTE-A Systems by Xi Chen et al.—IEEE 2011.
(Continued)

*Primary Examiner* — Hashim Bhatti
(74) *Attorney, Agent, or Firm* — Baker Botts, LLP

(57) ABSTRACT

The present disclosure relates to a method and device (10) for enabling downlink (DL) coordinated multipoint (CoMP) communication. In particular it relates to a method of enabling CoMP in legacy user equipments, i.e. devices that only measures and reports the channel quality of the link to its primary serving point. The method comprises the steps receiving the at least one DL channel quality measurement (SI), receiving at least one uplink (UL) measurement of the respective UL channels from the wireless device to one of the multiple access points (S2), and estimating a coordinated DL multipoint channel quality of a coordinated multipoint channel corresponding to one or more different coordinated transmission states of the access points, based on the at least one DL channel quality measurement and the received UL measurements, by assuming that the DL path gains from the
(Continued)

multiple access points to the wireless device are proportional to the UL path gains to the multiple access points for respective access point, thereby predicting link quality of inter-access-points-coordinated DL multipoint transmissions from the access points.

16 Claims, 3 Drawing Sheets

(51) Int. Cl.
*H04B 7/04* (2017.01)
*H04W 24/08* (2009.01)
*H04L 25/02* (2006.01)
*H04B 7/06* (2006.01)

(52) U.S. Cl.
CPC ......... *H04L 25/0204* (2013.01); *H04W 24/08* (2013.01); *H04B 7/063* (2013.01); *H04B 7/0639* (2013.01)

(56) References Cited

U.S. PATENT DOCUMENTS

| | | | |
|---|---|---|---|
| 2012/0287799 A1* | 11/2012 | Chen | H04B 7/024 370/252 |
| 2014/0286274 A1* | 9/2014 | Liu | H04W 52/146 370/329 |
| 2016/0066340 A1* | 3/2016 | Zhang | H04W 72/1231 370/252 |

OTHER PUBLICATIONS

Extended European Search Report for Application No. / Patent No. 13883145.8-1874 / 298981 PCT/CN2013074769—Oct. 31, 2016.
Coordinated Multipoint Transmission and Reception in LTE-Advanced: Deployment Scenarios and Operational Challenges; LTE-Advanced and 4G Wireless Communications; by Daewon Lee et al.; IEEE Communication Magazine—Feb. 2012.
PCT International Search Report for International application No. PCT/CN2013/074769, dated Feb. 13, 2014.
EPO "Communication Pursuant to Article 94(3) EPC", Application No. 13 883 145.8-1874, dated Sep. 28, 2017; 8 pages.

* cited by examiner

METHOD AND DEVICE FOR ENABLING DOWNLINK COORDINATED MULTIPOINT COMMUNICATION

PRIORITY

This nonprovisional application is a U.S. National Stage Filing under 35 U.S.C. § 371 of International Patent Application Serial No. PCT/CN2013/074769, filed Apr. 26, 2013, and entitiled "A Method And Device For Enabling Downlink Coordinated Multipoint Communication."

TECHNICAL FIELD

The present disclosure relates to a method and device for enabling downlink coordinated multipoint communication, CoMP. In particular it relates to a method of enabling CoMP in Legacy user equipments, i.e. devices that only measures and reports the channel quality of the link to its primary serving point.

BACKGROUND

LTE Advanced coordinated multipoint, CoMP, is used to send and receive data to and from a wireless device or user equipment, UE, from several points.

LTE Coordinated Multipoint is essentially a range of different techniques that enable the dynamic coordination of transmission and reception over a variety of different base stations. The aim is to improve overall quality for the user as well as improving the utilisation of the network. LTE Advanced CoMP turns the inter-cell interference, ICI, into useful signal, especially at the cell borders where performance may be degraded.

LTE CoMP, Coordinated Multipoint requires coordination between several of geographically separated base stations or evolved Node B:s, eNB. In CoMP the eNB:s dynamically coordinate their transmissions to provide joint scheduling and transmissions, as well as proving joint processing of the received signals. In this way a UE at the edge of a cell is able to be served by two or more eNBs to improve signals reception/transmission and increase throughput particularly under cell edge conditions.

Currently in 3GPP, several downlink, DL, CoMP modes are being discussed and will be included into the specification. Compared to the coherent Joint TX, which has been available in previous 3GPP releases, these CoMP modes have benefits that a tight synchronization between cooperative points is not mandatory so that the network implementation and deployment cost can be significantly reduced. However, the DL LTE CoMP modes require dynamic coordination amongst several geographically separated eNBs transmitting to the UE.

In contrast of uplink, UL, CoMP, where the signal and link quality could be measured at the base station or access point sides, DL CoMP needs sufficient and accurate quality measurement and report support at the UE sides. Some of these might not be available or not standard compatible. Hence, DL CoMP might be more difficult to get gains if information is hard to obtain or inaccurate, due to the aforementioned reasons. Furthermore, after the deployment of 3GPP-4G release 11 networks, there will still be a high ratio of legacy i.e. 3GPP-4G release 8-10 UEs.

Legacy UE only measures the Channel State Information, CSI, for a single link from its serving point. Therefore, the DL comp modes are not enabled for these legacy UEs.

SUMMARY

This disclosure provides a method for providing methods to enable DL comp modes for UEs that only measures the Channel State Information, CSI, for a single link from its serving point. Hence, an object of the present disclosure is e.g. to provide methods to enable DL comp modes for legacy UEs. How this is achieved will be explained further below.

The proposed technique is based on an insight that an advanced method to derive the aggregate or cooperative link Channel State Information, CSI, can be decisive to realize the benefits expected from the downlink, DL, CoMP deployment. This requires estimation of the cooperative-link or aggregate link CSI for a Rel8, 9, 10-compatible UE, scheduled in DL CoMP modes. The method is based on the serving access point CSI report and uplink, UL, measurements at the cooperative APs. By this way, a legacy user can benefit from the aforementioned DL CoMP deployments in LTE systems. Still no modifications to the UE are required.

According to one aspect, the disclosure relates to a method, in a node in a cellular communication system, of enabling DL coordinated multipoint communication between a wireless device and multiple access points, the wireless device reporting at least one DL channel quality measurement of one DL channel from one of the multiple access points to the wireless device. The method comprises the steps receiving the at least one DL channel quality measurement, receiving at least one UL measurement of the respective UL channels from the wireless device to one of the multiple access points and estimating a coordinated DL multipoint channel quality of a coordinated multipoint channel corresponding to one or more different coordinated transmission states of the access points, based on the at least one DL channel quality measurement and the received UL reference measurements, by assuming that the DL path gains from the multiple access points to the wireless device are proportional to the UL path gains to the multiple access points for respective access point, thereby predicting link quality of inter-access-points-coordinated DL multipoint transmissions from the access points. Hence, CoMP mode is enabled for legacy user equipments, without any modification to the user terminal.

According to one aspect, the step of estimating a coordinated DL multipoint channel quality comprises calculating the DL path gains or ratios between the different path gains between the access points and the wireless device, using the measurements of the UL channels.

According to one aspect, the UL measurements are performed on known reference data. According to another aspect, the UL measurements are performed on control data or payload.

According to one aspect, the step of estimating a coordinated DL multipoint channel quality comprises estimating one DL channel quality for the respective DL channel from one of the access points to the wireless device.

According to one aspect, the step of estimating a coordinated DL multipoint channel quality comprises estimating one aggregated DL channel quality for one joint DL channel from the multiple access points to the wireless device.

According to one aspect, the step of estimating a coordinated DL multipoint channel quality comprises estimating different DL channel qualities of a DL channel from one of the access points to the wireless device, covering the cases where one or more of the other access point is blanked or not blanked.

According to one aspect, the method further comprises estimating a preferred rank of the DL transmission from the respective access point based on the estimated coordinated DL channel quality indicator.

According to one aspect, the estimation of the preferred rank is based on a mapping table identifying rank numbers according to its corresponding estimated channel quality interval.

According to one aspect, the method further comprises estimating a precoding matrix of the DL transmission from the respective access point, based on at least one of the estimated channel quality, the determined rank number, the reports from wireless devices and the UL measurements.

According to one aspect, the precoding matrix is calculated such that SINR is maximised.

According to one aspect, the method further comprises using the estimated coordinated DL channel quality for determining a DL cooperation state According to one aspect, this disclosure relates to a computer program, comprising computer readable code which, when run on a node in a cellular communication system, causes the node to perform the method as described above and below.

According to one aspect, the present disclosure relates to a node, typically located in a cellular communication system. The node being configured to enable DL coordinated multipoint communication between a wireless device and multiple access points, the wireless device reporting at least one DL channel quality measurement of a DL channel from one of the multiple access points to the wireless device. The node comprises a network communication unit, a processor and a memory. The memory stores computer program code which, when run in the processor, causes the wireless device to:
  receive, using the network communication unit, the at least one DL channel quality measurement;
  receive, using the network communication unit, a measurement of the respective UL channel from the wireless device to one of the multiple access points; and
  estimate, using the processor, a coordinated DL multipoint channel quality corresponding to one or more different coordinated transmission states between the access points, based on the at least one DL channel quality measurement and the received UL reference measurements, by assuming that the DL path gains between the multiple access points is proportional, to the UL path gains for respective access point, thereby estimating effective link quality of inter-access-points-coordinated DL transmissions from the access points.

With the above description in mind, the object of the present disclosure is to overcome at least some of the disadvantages of known technology as previously described.

DETAILED DESCRIPTION

In the following, a detailed description of the exemplary embodiments of the present disclosure is described in conjunction with the drawings, in several scenarios to enable easier understanding the solution(s) described herein.

In this application the term wireless device is generally used. A wireless device, or user equipment, UE, which is the term used in the 3GPP specifications, referred to in this application could be any wireless device capable of communicating with a wireless network. Examples of such devices are of course mobile phones, smartphones, laptops and Machine to Machine, M2M, devices etc.

Embodiments of the present disclosure relate, in general, to the field of enabling CoMP mode in legacy UEs in a 4G cellular communication system. However, it must be understood that the presented method of estimating a coordinated downlink channel quality indicator can be utilised for other applications. The embodiments relate in general to TDD systems, where the reciprocity is high. However, it must be assumed that the technique may also be implemented in a Frequency Division Duples, FDD, system. However, in a FDD system the accuracy of the estimation may be lower depending on the UL and DL characteristics.

This disclosure proposes that a cooperative downlink, DL, reference signal to noise and Interference Ratio, SINR, of the corresponding CoMP mode, where several access points collaborate, is estimated based on received uplink, UL, measurements among the cooperative base stations and the reported quality measurement for the serving cell. For instance, among the measurement parameters, received power difference can be obtained based on UL reference measurements at the respective APs.

According to one aspect of this disclosure, the preferred cooperative link DL TX rank and pre-coding matrix is then derived from the estimated SINR estimate of the cooperative DL and UL channel measurements.

Figure 1A:
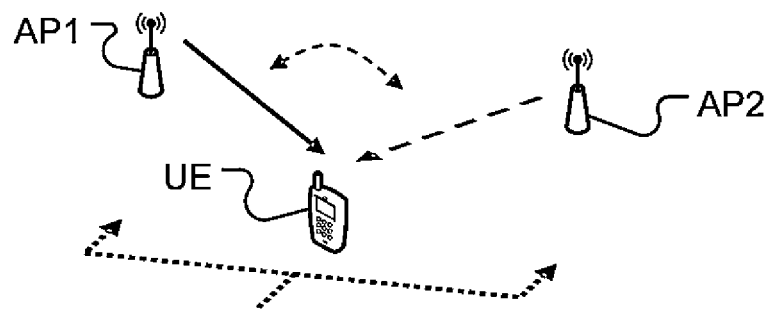
FIG. 1a schematically illustrates a Dynamic Point Selection in a mobile communication network.
Figure 1B:
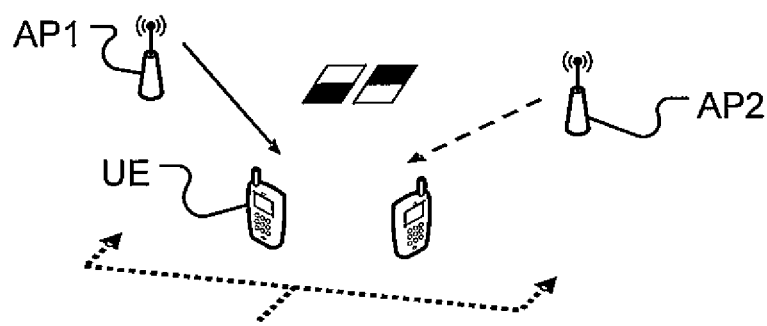
FIG. 1b schematically illustrates Dynamic Point Blanking in a mobile communication network.
Figure 1C:
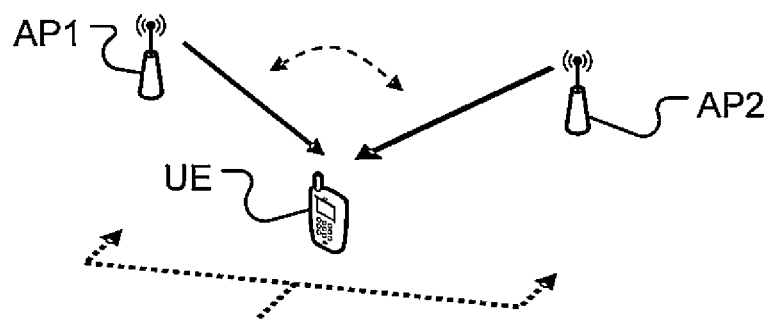
FIG. 1c schematically illustrates Non-coherent Joint TX in a mobile communication network.

The following CoMP modes are presently being discussed:
  Dynamic Point Selection, DPS—In DPS, the best AP is dynamically selected, within a group of cooperative candidate APs, to serve a UE so that DL TX performance of the UE can be improved. DPS is illustrated in FIG. 1a. When the wireless device, UE, in FIG. 1a is in DPS mode it is conditionally served by base station AP1 and base station AP2.
  Dynamic Point Blanking, DPB—In DPS mode part or all neighboring cooperative APs allocate different time-frequency resources for their serving users in the same transmission time interval, TTI, to reduce the inter-cell interference to certain sector. DPB is illustrated in FIG. 1b. When one UE is in DPB mode, it is served by AP1. The neighboring transmission point or points, AP2, blank the corresponding time frequency resources, e.g. depending on reported CQI.
  Non-coherent Joint TX, NJT—In NJT mode, more than one point transmits same data blocks to a UE simultaneously. The UE receives a combined version of signals from the more than one signal paths from different APs. The jointly transmitted signal can raise an average signal to noise plus interference ratio. At a consequence, the DL TX quality is improved. NJT is illustrated in FIG. 1c. When one UE is in NJT mode it is conditionally served by AP1 and AP2.

A wireless device in a cellular communication typically measures, for the channel from the serving access point to the wireless device, Channel State Information, CSI, including Channel Quality Indicator, CQI, (wideband or sub-band CQI), Rank Indicator, RI, and Pre-coding Matrix Indicator, PMI. The CSI content and its measurement are different for variant DL transmission modes, TM, at LTE. For instance, the transmission modes, TM, 1 or 2, there is only CQI measurement and report. For TM 3, there are CQI and RI measurement report. For TM4 and TM9, the UE should measure and report CQI, RI and PMI for CSI reporting on a serving DL link.

In 3GPP-4G release 11, aforementioned CoMP modes are going to be introduced. CSI in any of the mentioned CoMP mode have to include content for more links from the cooperative transmission, TX, points to enable the effective operations of these CoMP modes.

For DPS, CSI are needed and include link information from all candidates cooperative TX points so that the network can select the best point to serve the UE.

For NJT, the CSI about the estimated composite channel from more than one cooperative TX points that serve the UE are needed.

For DPB, CSI is needed to determine an accurate, Modulation and Coding Scheme, MCS, to capture the blanking gain, when blanking is enabled.

Hence, in the presented DL CoMP modes the cooperative-link CSI is a precondition for APs to determine the DL cooperation state, scheduling priority for the candidate UE and the modulation and coding scheme once the candidate UE is scheduled. It is meaningful to have this method because the largest portion of UEs will possibly be of legacy UE types at first a few years of TD-LTE deployments.

According to the proposed technique, a SINR for CoMP TX is determined according to reported single-stream CQI or multiple-stream CQIs for the link from an serving AP and the UL signal measurements at both the serving AP and cooperative AP as will now be described in more detail.

In a TDD system, a serving AP can configure its UE to transmit the sounding/data signals in UL. The two APs, AP1 and AP2, then simultaneously receive the sounding /data signal and estimate the signal strength: $P_{rx,srs,1}$ and $P_{rx,srs,2}$, respectively. Then the UL path gain difference between AP1 and AP2 can be expressed as:

$$G_{UL,i} = \text{diag}\{(H_{srs,1}W_i)^H(H_{srs,1}W_i)\} \quad \text{(Equation 1)}$$

Where $G_{UL,1}$ and $G_{UL,2}$ is the effective UL path gain vectors (or scalar for single stream) from the UE to AP1 and AP2 respectively. $W_i$, $W_1$, or $W_2$, is the potential downlink beam forming (DL BF) weights (or UL combining weights) calculated separately by AP1 and AP2 according to the channel estimate H of DL.

According the channel reciprocity, the difference between the DL path gains from AP1 and AP2 to the UE can be the same as the UL path gain difference, i.e.

$$\vec{\beta} = G_{DL,2}/G_{DL,1} = G_{UL,2}/G_{UL,1} \quad \text{(Equation 2)}$$

Where $G_{DL,1}$ and $G_{DL,2}$ is the DL path gain from AP1 and AP2 to the UE respectively. For multiple streams, the elements of the division operation are done element-wise corresponding to one of the streams.

Figure 2:
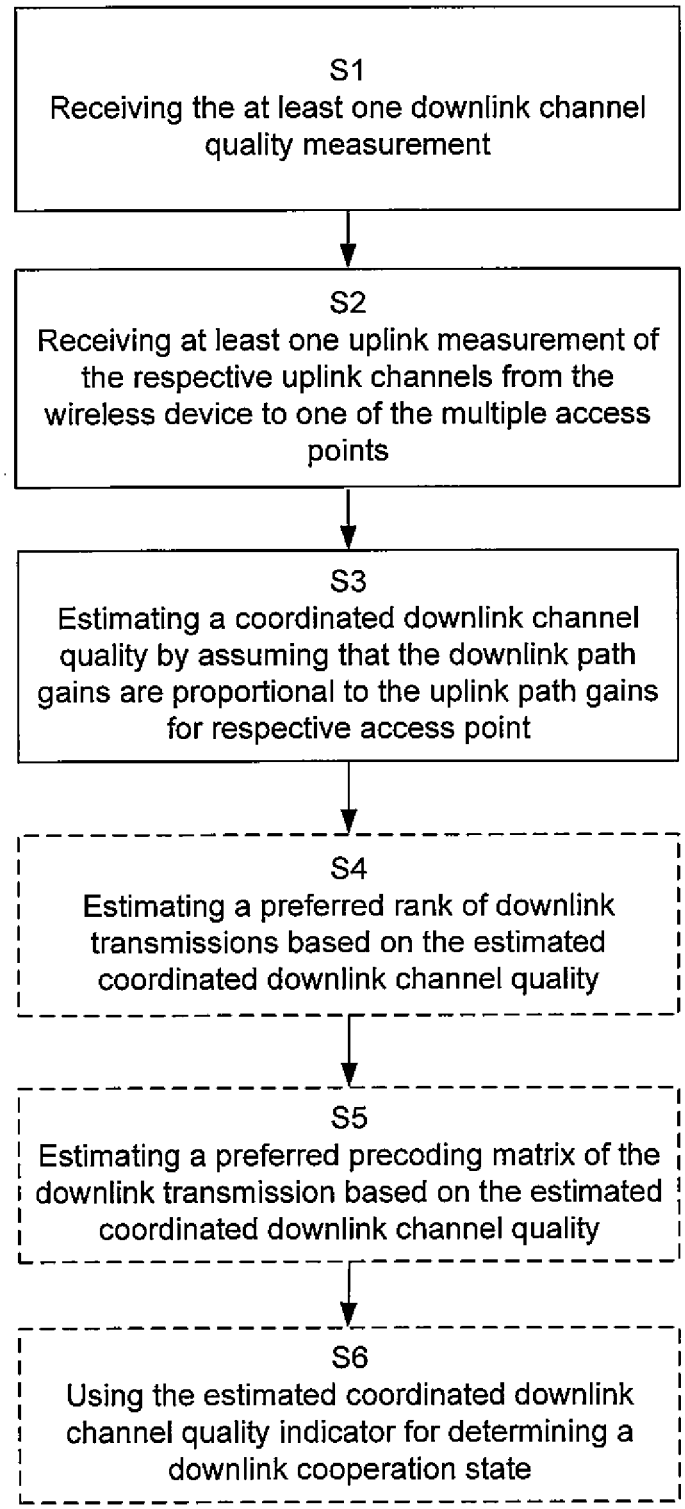
FIG. 2 is a flowchart illustrating main method steps performed by a node in a cellular communication system, according to one aspect of the presented technique.

FIG. 2 is a flowchart illustrating main method steps performed by a node in a cellular communication system like the one described in FIGS. 1a-1c, according to one aspect of the presented technique.

The proposed technique relates to a method, in a node in a cellular communication system. The node is e.g. an evolved Node B, but in principle the method may be executed in any node in the cellular communication system, having access to the data as will be specified below.

The method relates to enabling DL coordinated multipoint communication, CoMP, between a wireless device or user equipment, UE, and multiple access points, AP1, AP2, where the wireless device reports at least one DL channel quality measurement to the serving access point. According to one aspect the US is a legacy UE, only reporting measurements for one access point, i.e. the serving access point. The at least one DL channel quality measurement is a measurement of one DL channel from one of the multiple access points to the wireless device e.g. a Channel Quality Indicator, Rank Indicator and Precoding Matrix Indicator.

For simplicity in this description the examples comprises two access points. However, it must be appreciated that the method is applicable in any system comprising any number of access point above one.

The method starts with the step of receiving, S1, the at least one DL channel quality measurement. This implies that the wireless device reports at least a quality value corresponding to the DL channel between the serving access point and the wireless device. This measurement is forwarded to the node enabling CoMP.

In the next step the node receives, S2, at least one UL measurement of the respective UL channel from the wireless device to one of the multiple access points. According to one aspect, one UL measurement is received for each access point, for which CoMP mode is enabled. According to one aspect, the UL measurements are performed on known reference data, such as a sounding signal. It is also possible to perform the UL measurements on control data or payload. However, measuring on a predefined sequence, which is the same and equal in time for all access points, will give a more exact estimation.

Finally, the coordinated DL multipoint channel quality of a coordinated multipoint channel corresponding to one or more different coordinated transmission states of the access points, is estimated, S3. The estimation is based on the at least one DL channel quality measurement and the received UL reference measurements. Based on implies that the estimation may be based on any function of the measurements or intermediate calculation values such as average or filtering of measurement as well.

The estimation is done by assuming that the DL path gains from the multiple access points to the wireless device are proportional to the UL path gains to the multiple access points for respective access point.

Hence, the difference between the DL path gains from AP1 and AP2 to the UE is assumed to be the same as the UL path gain difference between the UL path gains. By using this assumption it is possible to predict link quality of inter-access-points-coordinated DL multipoint transmissions from the access points, as will be described in the examples below. Thereby, comp mode is enabled, because the estimated coordinated DL multipoint channel quality, is used to determine e.g. the CoMP mode.

According to one aspect of the disclosure, the step of estimating a coordinated DL multipoint channel quality comprises calculating the DL path gain $G_{DL,n}$. Hence, by using the assumption above, it is possible to calculate the DL path gain even for an access point not reporting any DL channel quality measurement.

According to one aspect of the disclosure, the step of estimating a coordinated DL multipoint channel quality comprises ratios between the different path gains between the access points and the wireless device, $\vec{\beta} = G_{DL,2}/G_{DL,1}$, using the measurements of the UL channels. According to the channel reciprocity, the difference between the DL path gains from AP1 and AP2 to the UE can be the same as the UL path gain difference.

According to one aspect of the disclosure, the step of estimating a coordinated DL multipoint channel quality comprises estimating one DL channel quality for the respective DL channel from one of the access points to the wireless device. This is typically the case in Dynamic Point Selection, DPS, where the wireless device uses the estimated DL channel quality to decide which access point to select within a group of cooperative candidate APs.

According to one aspect of the disclosure, the step of estimating a coordinated DL multipoint channel quality comprises estimating one aggregated DL channel quality for one joint DL channel from the multiple access points to the wireless device. Hence, an aggregated quality measure is calculated corresponding to the case where several access points send the same information simultaneously. This is typically the case in Non-coherent Joint TX, where it is desired to compare a joint DL channel, with the individual channels.

According to one aspect of the disclosure, the step of estimating a coordinated DL multipoint channel quality comprises estimating different DL channel qualities of a DL channel from one of the access points to the wireless device, covering the cases where one or more of the other access point is blanked or not blanked. In principle this means that one quality estimation is made for the case where the neighbouring cell is blanked and one quality estimation is made for the case where it is not blanked. This is typically the used in Dynamic Point Blanking, DPB, where it is desired to decide whether to blank one or more neighbouring transmission points or not.

According to one aspect of the disclosure, the step of estimating the coordinated DL channel quality for the multipoint channel comprises assuming that the DL path gain is equal to the UL path gain $G_{DL,1}=G_{UL,1}$. It may also be expressed as that the proportionality constant k=1. Such an assumption is not that accurate, but very simple and may be useful at least for time Division Duplex, TDD, where the same spectrum is used for UL and DL.

According to one aspect of the disclosure, the channel quality is a Signal to Interference Ratio, SINR. SINR is typically defined as $$SINR \approx \frac{P}{I_{own} + I_{oth} + N_0}$$

where P is the user received power, $I_{own}$ is the "own-cell" received interference power, which is introduced by the same cell, $I_{other}$ is the "other cells" received interference power caused by the users and common channels in the neighbouring cells and No is the noise power.

According to one aspect of the disclosure, the method further comprises, using, S6, the estimated coordinated DL channel quality for determining a DL cooperation state.

For example, a wireless device in DPS mode is conditionally served by AP1 and AP2. Transmission states 1 or 2 can refer to the state when the UE is being served by TP1 or TP2, respectively.

Another example is when one wireless device is in DPB mode. Transmission state 1 or 2 can refer to the state when one or several neighboring access points are blanked or not blanked.

Or when one UE in NJT mode, i.e. conditionally served by AP1,or/and AP2. Transmission state 1/2/3 can then refer to the state when the UE is being served by TP1 solely, TP2 solely, or jointly by TP1 and TP2.

In the following, given that UE only measures and reports the CSI of the serving point only as standardized the at 3GPP-4G release 10, two embodiments are exemplified for the different CoMP modes DPS /NJT and DPB. Note that there are two CoMP APs in this description. However, the skilled people can easily extend the idea to more than two CoMP APs.

SINR Derivation for DPS and Non-Coherent JT

In practice, usually, an example of SINR and the CQI mapping can be expressed as Equation 3

CQI=$f$(SINR)=min(max(SINR/granularity+measure_offset, 0), max CQI)  (Equation 3)

Hence, according to Equation 3, the UE measured SINR can be derived according to the reported CQI according to Equation 4

SINR≈$f^{-1}$(CQI)  (Equation 4)

Essentially, $SINR_1$ can be expressed as:

$$\frac{P_{tx,rs,1} \cdot G_{DL,1}}{P_{tx,rs,2} \cdot G_{DL,2} + I_{other} + N_0} \approx SINR_1 \quad \text{(Equation 5)}$$

Where $P_{tx,rs,1}$ and $P_{tx,rs,2}$ is the transmit power of the DL reference signal for CQI measurement of AP1 and AP2 respectively, $G_{DL,1}$ and $G_{DL,2}$ is the DL path gain from AP1 and AP2 to the UE respectively, $I_{other}$ is the "other cells" received interference power caused by the users and common channels in the neighbouring cells and No is the noise power.

Generally, reference signal for CQI reporting was broadcasted and UE assumed a DL BF matrix at its calculation. This BF matrix might only have similar values as the eNB assumed. In addition, for different CoMP modes, interference from neighboring cells could be different in BF matrixes. Hence, the equation only holds relatively.

Equation 6 then can be transformed into:

$$\frac{K_1}{K_2 + 1} \approx SINR_1 \quad \text{(Equation 6)}$$

Where $$K_1 = \frac{P_{tx,rs,1} \cdot G_{DL,1}}{I_{other} + N_0} \quad \text{(Equation 7)}$$

$$K_2 = \frac{P_{tx,rs,1} \cdot G_{DL,2}}{I_{other} + N_0}$$

Considering Equation 2 and 7, then $$\frac{K_1}{K_2} = \quad \text{(Equation 8)}$$

$$\frac{P_{tx,rs,1} \cdot G_{DL,1}}{P_{tx,rs,2} \cdot G_{DL,2}} = \left(\frac{P_{tx,rs,1}}{P_{tx,rs,2}}\right) \cdot \left(\frac{G_{DL,1}}{G_{DL,2}}\right) = \left(\frac{P_{tx,rs,1}}{P_{tx,rs,2}}\right) \cdot \left(\frac{G_{UL,1}}{G_{UL,2}}\right)$$

From Equation 6 and 8, ratio between $K_1$ and $K_2$ can be derived and so as to get their absolute values.

According to $K_1$ and $K_2$, the CQI for any of the aforementioned CQI can be derived for the UE as follows:

For DPS, the $SINR_2$ with respect to AP2 can be estimated as:

$$SINR_2 \approx \frac{P_{tx,rs,1} \cdot G_{DL,2}}{P_{tx,rs,2} \cdot G_{DL,1} + I_{other} + N_0} = \frac{K_2}{K_1 + 1} \quad \text{(Equation 9)}$$

For NJT, the $SINR_{NJT}$ with respect to non-coherent joint TX of AP1 and AP2 can be estimated by:

$$SINR_{tot} \approx \frac{P_{tx,rs,2} \cdot G_{DL,1} + P_{tx,rs,1} \cdot G_{DL,2}}{I_{other} + N_0} = K_1 + K_2 \quad \text{(Equation 10)}$$

Where $SINR_{tot}$ is the equivalent SINR of NJT TX.

SINR Derivation for DPB

Assuming AP1 is the serving point for the UE, the UE reported sub band/wideband CQI in relation to AP1 $SINR_1$ can be expressed as:

$$\frac{P_{tx,rs,1} \cdot G_{DL,1}}{(1-\beta) \cdot P_{tx,rs,2} \cdot G_{DL,2} + I_{other} + N_0} \approx SINR_1 \quad \text{(Equation 11)}$$

When DPB is disabled or power reduced, $\beta$ is zero or a fractional value.

Equation 11 can be denoted as follows:

$$\frac{K_1}{(1-\beta) \cdot K_2 + 1} \approx SINR_1 \quad \text{(Equation 12)}$$

When DPB is enabled, the actual reference signal SINR within the available frequency band of the UE can be expressed as:

$$SINR_{DPB,1} \approx \frac{P_{tx,rs,1} \cdot G_{DL,1}}{I_{other} + N_0} = K_1 \quad \text{(Equation 13)}$$

PMI and RI Derivation

According to one aspect of the disclosure, it relates to a method of enabling DL coordinated multipoint communication, further comprising estimation, S4, S5 of a preferred rank and/or a pre-coding matrix.

As described above, PMI and RI are not necessary for transmission modes 1 and 2. In order to simplify the description, there is no special differentiation for different TX modes in the following description. For different TX modes, rank and or PMI can be achieved according to the corresponding description below when necessary.

When the selected AP for the DL data TX to the UE is the primary serving AP, RI and PMI reported by the UE can be used. If an AP other than the serving AP is selected for the DL TX, then the rank and pre-coding matrix can be determined as below.

According to one aspect of the disclosure a preferred rank is estimated using a mapping table identifying rank numbers according to a corresponding estimated channel quality interval. In such a mapping table a higher SINR is usually mapped to a higher rank.

According to another aspect of the disclosure, a precoding matrix of the DL transmission from the respective access point is estimated, based on at least one of the estimated channel quality, the determined rank number, the reports from wireless devices and the UL measurements. The precoding matrix can be calculated or selected to maximize the TX capacity i.e. the precoding matrix is calculated such that SINR is maximised.

For DPB, the AP for DL TX is the serving point. In one embodiment, the PMI and RI reported by the UE can be reused by the AP when DPB is employed. As an alternative, RI can be overridden based on the new CQI values according to estimated SINR values. PMI is used as reported.

For NJT, the effective DL channel is the composite channel of all cooperative points, e.g. by performing the following steps:

Step 1: The estimated channels based on the UL channel sounding can be combined into a single channel matrix as below:

$$H_{tot} = \begin{bmatrix} H_1 \\ H_2 \end{bmatrix}$$

Where $H_1$ and $H_2$ are the estimated channel matrix by AP1 and AP2 respectively. $H_1$ and $H_2$ are $N_{UE, rxant} \times N_{port, AP1}$ and $N_{UE, rxant} \times N_{port, AP2}$ matrix respectively. The channel rank can then be determined based on $H_{tot}$.

Step 2: Based on the estimated SINR and the channel matrix $H_{tot}$, the rank can be determined similarly.

Figure 3:
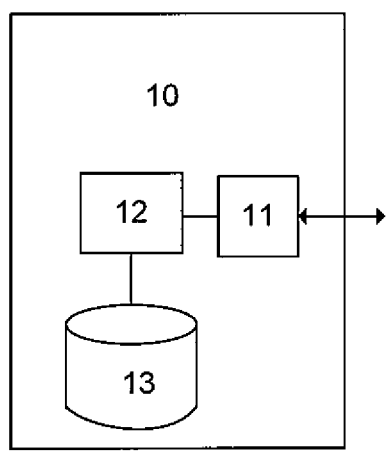
FIG. 3 is a block diagram illustrating an exemplary node in a cellular communication system according to the presented technique.

Turning now to FIG. 3, a schematic diagram illustrating some modules of an exemplary embodiment of a node located in a cellular communication system will be described.

The node may be a radio network node, e.g. a base station, AP1, AP2, another network node or a standalone unit. The node 10 is configured to enable DL coordinated multipoint communication between a wireless device and multiple access points, the wireless device reporting at least one DL channel quality measurement of a DL channel from one of the multiple access points to the wireless device. The radio network node 10 may be implemented as an Evolved Node B, eNB or eNodeB, in LTE, but may also be implemented in the radio access technology Global System for Mobile communications, GSM or Universal Mobile Telecommunications System or WiMax. The radio network node 10 comprises a controller or a processor 12 that may be constituted by any suitable Central Processing Unit, CPU, microcontroller, Digital Signal Processor, DSP, etc., capable of executing computer program code. The computer program may be stored in a memory 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory. The radio network node 10 further comprises a communication interface (i/f) 11 arranged for wireless communication with other devices or nodes, such as the nodes AP1, AP2 and the wireless device, UE in FIG. 1a-1c.

When the above-mentioned computer program code is run in the processor 12 of the radio network node 10, it causes the radio network node 10 to receive, using the network communication unit, the DL channel quality measurement. Receive, using the network communication unit, a measurement of the respective UL channel from the wireless device to one of the multiple access points, and estimate, using the processor, a coordinated DL multipoint channel quality corresponding to one or more different coordinated transmission states between the access points, based on the at least one DL channel quality measurement and the received UL reference measurements. The estimation is based on the assumption that the DL path gains between the multiple access points is proportional, to the UL path gains between the multiple access points, thereby estimating effective link quality of inter-access-points-coordinated DL transmissions.

The node is further configured to execute all the aspects of the method of enabling CoMP as described above, through execution of corresponding computer program code.

According to another aspect, the disclosure also relates to the above mentioned computer program, comprising computer readable code which, when run on a node in a cellular communication system, causes the node to perform the methods as described above and below.

As an alternative the steps, functions, procedures and/or blocks described above may as an alternative, be implemented in completely or partly in hardware using any conventional technology, such as discrete circuit or integrated circuit technology, including both general-purpose electronic circuitry and application-specific circuitry. The memory and the processor are then replaced by corresponding hardware blocks.

What is claimed is:

1. A method, in a node in a cellular communication system, of enabling downlink coordinated multipoint communication between a wireless device and multiple access points, the wireless device reporting at least one downlink channel quality measurement of one downlink channel from one of the multiple access points to the wireless device, the method comprising the following steps:
   receiving the at least one downlink channel quality measurement;
   receiving at least one uplink measurement of the respective uplink channels from the wireless device to one of the multiple access points; and
   estimating a coordinated downlink multipoint channel quality of a coordinated multipoint channel corresponding to one or more different coordinated transmission states of the access points, based on the at least one downlink channel quality measurement and the at least one uplink reference measurement, by assuming that the downlink path gains from the multiple access points to the wireless device are proportional to the uplink path gains to the multiple access points for respective access point, thereby predicting link quality of downlink coordinated multipoint communication transmissions from the access points.

2. The method of enabling downlink coordinated multipoint communication according to claim 1, wherein the step of estimating a coordinated downlink multipoint channel quality comprises calculating the downlink path gain or ratios between the different path gains between the access points and the wireless device, using the measurements of the uplink channels.

3. The method of enabling downlink coordinated multipoint communication according to claim 1, wherein the uplink measurements are performed on known reference data.

4. The method of enabling downlink coordinated multipoint communication according to claim 1, wherein the uplink measurements are performed on control data or payload.

5. The method of enabling downlink coordinated multipoint communication according to claim 1, wherein the step of estimating a coordinated downlink multipoint channel quality comprises estimating one downlink channel quality for the respective downlink channel from one of the access points to the wireless device.

6. The method of enabling downlink coordinated multipoint communication according to claim 1, wherein the step of estimating a coordinated downlink multipoint channel quality comprises estimating one aggregated downlink channel quality for one joint downlink channel from the multiple access points to the wireless device.

7. The method of enabling downlink coordinated multipoint communication according to claim 1, wherein the step of estimating a coordinated downlink multipoint channel quality comprises estimating different downlink channel qualities of a downlink channel from one of the access points to the wireless device, covering the cases where one or more of the other access point is blanked or not blanked.

8. The method of enabling downlink coordinated multipoint communication according to claim 1, wherein the step of estimating the coordinated downlink channel quality for the multipoint channel comprises assuming that the downlink path gain is equal to the uplink path gain.

9. The method of enabling downlink coordinated multipoint communication according to claim 1, wherein the channel quality is a Signal to Interference Ratio, SINR.

10. The method of estimating a coordinated downlink channel quality according to claim 1, further comprising:
    estimating a preferred rank of the downlink transmission from the respective access point based on an estimated coordinated downlink channel quality indicator.

11. The method of enabling downlink coordinated multipoint communication according to claim 10, wherein the estimation of the preferred rank is based on a mapping table identifying rank numbers according to its corresponding estimated channel quality interval.

12. The method of enabling downlink coordinated multipoint communication according to claim 1, further comprising:
    estimating a precoding matrix of the downlink transmission from the respective access point, based on at least one of the estimated channel quality, a determined rank number, the reports from wireless devices and the uplink measurements.

13. The method of enabling downlink coordinated multipoint communication according to claim 12, wherein the precoding matrix is calculated such that SINR is maximised.

14. The method of estimating a coordinated downlink channel quality according to claim 1, further comprising:
    using the estimated coordinated downlink channel quality for determining a downlink cooperation state.

15. A non-transitory computer-readable memory storing a computer program, the computer program comprising computer readable code which, when run on a node in a cellular communication system, causes the node to perform the method as claimed in claim 1.

16. A node being configured to enable downlink coordinated multipoint communication between a wireless device and multiple access points, the wireless device reporting at least one downlink channel quality measurement of a downlink channel from one of the multiple access points to the wireless device, wherein the node comprises:
    a network communication unit;
    a processor; and
    a memory storing computer program code which, when run in the processor, causes the wireless device to:

receive, using the network communication unit, the at least one downlink channel quality measurement;

receive, using the network communication unit, a measurement of the respective uplink channel from the wireless device to one of the multiple access points;

estimate, a coordinated downlink multipoint channel quality corresponding to one or more different coordinated transmission states between the access points, based on the at least one downlink channel quality measurement and the measurement of the respective uplink channel, by assuming that the downlink path gains between the multiple access points is proportional to the uplink path gains for respective access point, thereby estimating effective link quality of downlink coordinated multipoint communication transmissions from the access points.

* * * * *